United States Patent
Yanai

(10) Patent No.: US 12,066,283 B2
(45) Date of Patent: Aug. 20, 2024

(54) IDENTIFICATION METHOD, PROJECTION METHOD AND IDENTIFICATION SYSTEM

(71) Applicant: SEIKO EPSON CORPORATION, Tokyo (JP)

(72) Inventor: Kohei Yanai, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 328 days.

(21) Appl. No.: 17/540,710

(22) Filed: Dec. 2, 2021

(65) Prior Publication Data

US 2022/0178681 A1 Jun. 9, 2022

(30) Foreign Application Priority Data

Dec. 3, 2020 (JP) .................................. 2020-200813

(51) Int. Cl.
*G01B 11/25* (2006.01)
*G01B 11/02* (2006.01)
(Continued)

(52) U.S. Cl.
CPC .......... *G01B 11/254* (2013.01); *G01B 11/026* (2013.01); *G03B 17/54* (2013.01); *G06V 10/60* (2022.01)

(58) Field of Classification Search
CPC ...... G06V 10/467; G06V 10/50; G06V 10/25; G06V 10/44; G06V 10/52; G06V 10/60; G06V 10/764; G06V 10/143; G06V 10/28; G06V 10/56; G06V 10/761; G06V 20/10; G06V 2201/07; G06V 10/145; G06V 10/22; G06V 10/225; G06V 10/26; G06V 10/40;
(Continued)

(56) References Cited

U.S. PATENT DOCUMENTS 9,823,059 B2 * 11/2017 Li ........................... G01S 17/46
10,240,914 B2 * 3/2019 Li ......................... G01B 11/026
(Continued)

FOREIGN PATENT DOCUMENTS

CN 107948519 A * 4/2018 ........... F04D 23/008
CN 111885371 A * 11/2020 ........... H04N 17/002
(Continued)

OTHER PUBLICATIONS

Vezhnevets et al.; ""GrowCut": Interactive Multi-Label N-D Image Segmentation by Cellular Automata;" Proc. Graphicon; 2005.
(Continued)

*Primary Examiner* — Michael P Stafira
(74) *Attorney, Agent, or Firm* — Oliff PLC

(57) ABSTRACT

There is provided an identification method including obtaining first information for each of first pixels constituting a first image obtained by imaging the first object with a first camera, the first information related to reflected light from a first object including a body, obtaining second information for each of the first pixels, the second information corresponding to a distance from the first object to the first camera, obtaining an index value as a result of a calculation using the first information and the second information for each of the first pixels, and identifying a first area of the first image corresponding to the body by judging whether each of the first pixels belong to the first area based on the index value.

11 Claims, 5 Drawing Sheets

(51) Int. Cl.
*G03B 17/54* (2021.01)
*G06V 10/60* (2022.01)

(58) Field of Classification Search
CPC ...... G06V 10/54; G06V 10/758; G06V 10/77; G06V 10/774; G06V 10/80; G06V 10/806; G06V 10/82; G06V 10/945; G06V 20/00; G06V 20/13; G06V 20/52; G06V 20/58; G06V 20/64; G06V 20/68; G06V 2201/06; G06V 30/422; G01B 11/24; G01B 11/02; G01B 11/026; G01B 11/022; G01B 11/00; G01B 11/25; G01B 11/254; G01B 11/26; G03B 17/54
See application file for complete search history.

(56) References Cited

U.S. PATENT DOCUMENTS

2016/0162753 A1* 6/2016 Higaki ................. G06V 10/44
382/199
2017/0347079 A1* 11/2017 Wang ................... H04N 9/3188
2018/0167593 A1 6/2018 Narikawa et al.
2018/0259324 A1* 9/2018 Li ............................. G01S 17/89
2019/0073558 A1* 3/2019 Otake ..................... G06T 5/001
2019/0080472 A1* 3/2019 Terashima .............. G01B 11/00

FOREIGN PATENT DOCUMENTS

| JP | 2013195137 A | * | 9/2013 | |
|---|---|---|---|---|
| JP | 2017-091298 A | | 5/2017 | |
| JP | 2017130794 A | * | 7/2017 | ............... G06T 1/00 |
| JP | 2018-097165 A | | 6/2018 | |
| JP | 2019007744 A | * | 1/2019 | |
| WO | WO-2013038833 A1 | * | 3/2013 | ............. G01B 11/02 |

OTHER PUBLICATIONS

Hiroshi Ishikawa; "Graph Cut;" CVIM SIG Tutorial; 2007; IPSJ SIG Technical Reports; pp. 193-204.

* cited by examiner

IDENTIFICATION METHOD, PROJECTION METHOD AND IDENTIFICATION SYSTEM

The present application is based on, and claims priority from JP Application Serial Number 2020-200813, filed Dec. 3, 2020, the disclosure of which is hereby incorporated by reference herein in its entirety.

BACKGROUND

1. Technical Field

The present disclosure relates to an identification method, a projection method, an identification system, an information processing device, and a non-transitory computer-readable storage medium storing a program.

2. Related Art

In JP-A-2017-091298 (Document 1), there is disclosed a technology of detecting an area corresponding to a body from a taken image of an object including the body. In the technology disclosed in Document 1, there are loosely detected an area corresponding to the body and an area corresponding to the background using a depth map representing a distribution of depth values as distances between an imaging device and respective parts of the object. Further, in the technology disclosed in Document 1, whether the area where the depth values cannot be obtained due to the influence of a noise, occlusion, or the like is the area corresponding to the body or the area corresponding to the background is determined based on the colors.

In the technology disclosed in Document 1, since the depth values are not used when performing the judgment based on the colors, there is a possibility that an erroneous judgment occurs when there is a small difference in color between the body and the background showing up in the object. Similarly, when it is unachievable to accurately image the colors in a specific wavelength band due to the characteristics or an individual difference of the imaging device, there is a possibility that the erroneous judgment occurs.

SUMMARY

In view of the problems described above, an identification method according to the present disclosure includes the steps of obtaining first information related to reflected light from a first object including a body for each of first pixels constituting a first image obtained by imaging the first object with a first camera based on the first image, obtaining second information corresponding to a distance from the first object to the first camera for each of the first pixels, executing a calculation using the first information and the second information as variables to calculate an index value as a result of the calculation for each of the first pixels, and identifying the first area by judging whether to belong to a first area of the first image corresponding to the body for each of the first pixels based on the index value.

Further, in view of the problems described above, a projection method according to the present disclosure includes the steps of obtaining first information related to reflected light from a first object including a body for each of first pixels constituting a first image obtained by imaging the first object with a first camera based on the first image, obtaining second information corresponding to a distance from the first object to the first camera for each of the first pixels, executing a calculation using the first information and the second information as variables to calculate an index value as a result of the calculation for each of the first pixels, identifying the first area by judging whether to belong to a first area of the first image corresponding to the body for each of the first pixels based on the index value, and sectioning a projection image to be projected from a projector on the first object into a second area corresponding to the first area and a third area other than the second area, and then making the projector project the projection image in which the second area is filled with a first color, and the third area is filled with a second color.

Further, in view of the problems described above, an identification system according to the present disclosure includes a first camera, and an information processing device. In this identification system, the information processing device executes obtaining first information related to reflected light from a first object including a body for each of first pixels constituting a first image obtained by imaging the first object with the first camera based on the first image, obtaining second information corresponding to a distance from the first object to the first camera for each of the first pixels, executing a calculation using the first information and the second information as variables to calculate an index value as a result of the calculation for each of the first pixels, and identifying the first area by judging whether to belong to a first area of the first image corresponding to the body for each of the first pixels based on the index value.

Further, in view of the problems described above, an information processing device according to the present disclosure includes a module configured to obtain first information related to reflected light from a first object including a body for each of first pixels constituting a first image obtained by imaging the first object with a first camera based on the first image, a module configured to obtain second information corresponding to a distance from the first object to the first camera for each of the first pixels, a module configured to execute a calculation using the first information and the second information as variables to calculate an index value as a result of the calculation for each of the first pixels, and a module configured to identify the first area by judging whether to belong to a first area of the first image corresponding to the body for each of the first pixels based on the index value.

Further, in view of the problems described above, a non-transitory computer-readable storage medium according to the present disclosure stores a program for making a computer execute a method including obtaining first information related to reflected light from a first object including a body for each of first pixels constituting a first image obtained by imaging the first object with a first camera based on the first image, obtaining second information corresponding to a distance from the first object to the first camera for each of the first pixels, executing a calculation using the first information and the second information as variables to calculate an index value as a result of the calculation for each of the first pixels, and identifying the first area by judging whether to belong to a first area of the first image corresponding to the body for each of the first pixels based on the index value.

DESCRIPTION OF AN EXEMPLARY EMBODIMENT

An embodiment of the present disclosure will hereinafter be described with reference to the drawings. The embodiment described hereinafter is provided with a variety of technically preferable limitations. However, the embodiment of the present disclosure is not limited to the aspect described below.

1. Embodiment

Figure 1:
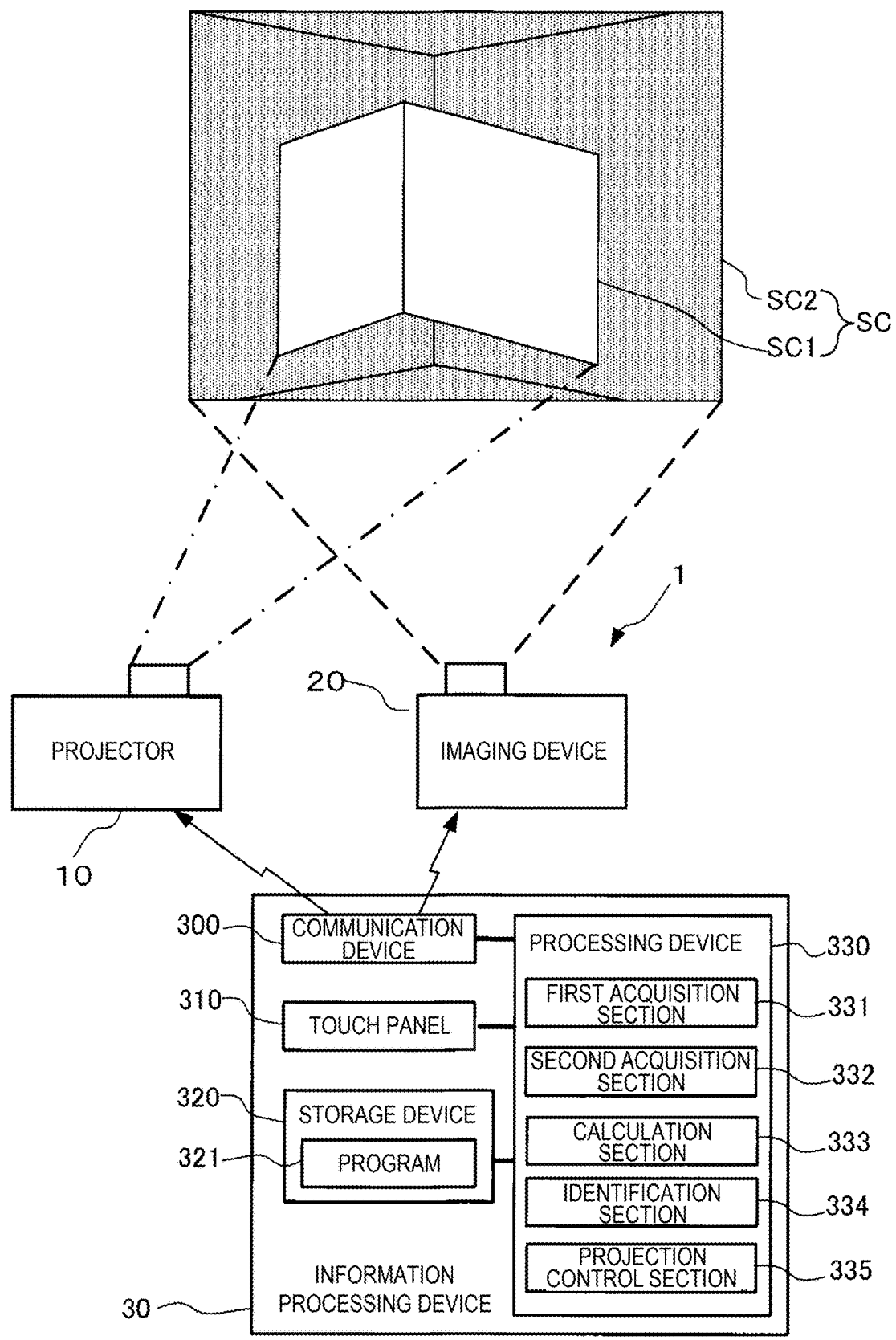
FIG. 1 is a block diagram showing a configuration example of a projection system including an information processing device for executing a projection method according to an embodiment of the present disclosure.

FIG. 1 is a schematic diagram showing an example of a projection system 1 according to an embodiment of the present disclosure. As shown in FIG. 1, the projection system 1 includes a projector 10, an imaging device 20, and an information processing device 30. The projection system 1 shown in FIG. 1 is a system for projecting an image on a body SC1 having a three-dimensional shape. In the projection system 1, an image of an object SC including the body SC1 and a background body SC2 is imaged by the imaging device 20. The object SC is an example of a first object in the present disclosure. The imaging device 20 is an example of a first camera in the present disclosure. The taken image of the object SC by the imaging device 20 is an example of a first image in the present disclosure.

In the projection system 1, an area corresponding to the body SC1 is identified by the information processing device 30 in the taken image of the object SC taken by the imaging device 20. Further, the information processing device 30 controls the projector 10 to project a projection image in which the area corresponding to the body SC1 is filled with a first color, and an area other than the area corresponding to the body SC1, namely an area corresponding to the background body SC2, is filled with a second color different from the first color on the object SC.

The projector 10 is provided with a liquid crystal light valve, a projection lens, and a liquid crystal drive section for projecting the projection image. Further, the projector 10 is provided with a super-high pressure mercury lamp or a metal halide lamp as a light source. The projector 10 is coupled to the information processing device 30 with, for example, a cable so as to be able to communicate therewith. The projector 10 obtains image data representing an image from the information processing device 30 with the communication via the cable. The projector 10 projects the image represented by the image data thus obtained on the object SC. In the present embodiment, the communication between the projector 10 and the information processing device 30 is wired communication compliant with a standard such as Ethernet or USB (Universal Serial Bus). However, the communication between the projector 10 and the information processing device 30 can be wireless communication compliant with a standard such as Wi-Fi. It should be noted that Wi-Fi and Ethernet are each a registered trademark.

The imaging device 20 is, for example, a camera provided with an imaging element for converting the light collected into an electric signal such as a charge coupled device (CCD) or a complementary metal oxide semiconductor (CMOS). In order to simplify the description, it is hereinafter assumed that the imaging device 20 takes a still image. It should be noted that the imaging device 20 can take a moving image instead of taking a still image. The imaging device 20 takes an image of the object SC. The imaging device 20 is coupled to the information processing device 30 with, for example, a cable so as to be able to communicate therewith similarly to the projector 10. The imaging device 20 transmits image data representing the image thus taken to the information processing device 30. In the present embodiment, the communication between the imaging device 20 and the information processing device 30 is wired communication compliant with a standard such as Ethernet or USB, but can also be wireless communication compliant with a standard such as Wi-Fi.

The information processing device 30 is, for example, a personal computer. As shown in FIG. 1, the information processing device 30 has a communication device 300, a touch panel 310, a storage device 320, and a processing device 330. To the communication device 300, there is coupled the projector 10 via the cable. Further, to the communication device 300, there is coupled the imaging device 20 via the cable. The communication device 300 receives the image data transmitted from the imaging device 20. Further, the communication device 300 transmits the image data representing the image to be projected on the object SC under the control by the processing device 330.

The touch panel 310 is a device including a display device for displaying an image and an input device to which information is input by a user integrated with each other. The input device is, for example, a contact sensor like a transparent sheet. The input device is disposed so as to cover a display surface of the display device. The input device detects a touch position using a capacitance identified by the body having contact with the input device and the input device. The input device outputs data representing the touch position thus detected to the processing device 330. Thus, the operation content of the user to the touch panel 310 is transmitted to the processing device 330.

The storage device 320 is a recording medium which can be read by the processing device 330. The storage device 320 includes, for example, a nonvolatile memory and a volatile memory. The nonvolatile memory is, for example, a ROM (Read Only Memory), an EPROM (Erasable Programmable Read Only Memory), or an EEPROM (Electrically Erasable Programmable Read Only Memory). The volatile memory is, for example, a RAM (Random Access Memory).

In the nonvolatile memory of the storage device 320, a program 321 to be executed by the processing device 330 is stored in advance. The volatile memory of the storage device 320 is used by the processing device 330 as a work area when executing the program 321. The program 321 can also be referred to as an "application program," "application software," or an "app." The program 321 is obtained from, for example, a server not shown via the communication device 300, and is then stored in the storage device 320.

The processing device 330 is configured including a processor such as a CPU (Central Processing Unit), namely a computer. The processing device 330 can be formed of a single computer, or can also be formed of a plurality of computers. Taking the fact that the operation of instructing the start of the execution of the program. 321 is made on the input device not shown as a trigger, the processing device 330 retrieves the program 321 from the nonvolatile memory to the volatile memory. The processing device 330 executes the program 321 thus retrieved to the volatile memory. The processing device 330 which is currently operating in accordance with the program 321 functions as a first acquisition section 331, a second acquisition section 332, a calculation section 333, an identification section 334, and a projection control section 335 shown in FIG. 1. The first acquisition section 331, the second acquisition section 332, the calculation section 333, the identification section 334, and the projection control section 335 shown in FIG. 1 are software modules which are realized by making the processing device 330 operate in accordance with the program 321. The functions of the first acquisition section 331, the second acquisition section 332, the calculation section 333, the identification section 334, and the projection control section 335 are as follows.

The first acquisition section 331 obtains reflected light information related to reflected light from the object SC for each of the pixels constituting the first image based on the taken image of the object SC by the imaging device 20, namely the first image. The pixels constituting the first image are each an example of a first pixel in the present disclosure. The reflected light information in the present embodiment is luminance information representing the luminance of the reflected light from the object SC. In the present embodiment, the taken image by the imaging device 20 is a luminance image the pixel value of which represents the luminance of the reflected light from the object. Therefore, in the present embodiment, the image data output from the imaging device 20 corresponds to the reflected light information. It should be noted that the reflected light information can be grayscale information representing a gray level of each of R, G, and B colors in the reflected light from the object. Further, the reflected light information can be information representing both of the luminance and the gray level of the reflected light. The reflected light information is an example of first information in the present disclosure.

The second acquisition section 332 obtains distance information corresponding to a distance from each part of the object SC to the imaging device 20 for each of the first pixels. In the present embodiment, the second acquisition section 332 makes the projector 10 project a pattern image for obtaining the distance information to the object SC. As a specific example of the pattern image to be projected from the projector 10 to the object SC, there can be cited an image of a gray code pattern, an image of a binary code pattern, or an image of a phase-shift pattern. Subsequently, the second acquisition section 332 makes the imaging device 20 take an image of the object SC in a state in which the pattern image is projected thereon. The taken image of the projection target SC in the state in which the pattern image is projected thereon taken by the imaging device 20 is an example of a second image in the present disclosure. The plurality of pixels constituting the second image is an example of third pixels corresponding one-to-one to the first pixels constituting the first image. Further, the second acquisition section 332 obtains the distance information for each of the first pixels due to a principle of triangulation based on the pattern image and the taken image of the object SC in the state in which the pattern image is projected thereon. The distance information is an example of second information in the present disclosure.

In the present embodiment, information representing the positions of the projector 10 and the imaging device 20, namely external parameters of the projector 10 and the imaging device 20, are stored in advance in the storage device 320. Further, information representing a focal point and a lens strain of the projection lens of the projector 10, namely internal parameters of the projector 10, are also stored in advance in the storage device 320. Further, information representing a focal point and a lens strain of an imaging lens of the imaging device 20, namely internal parameters of the imaging device 20, are also stored in advance in the storage device 320. The external parameters and the internal parameters are used when performing the triangulation.

The calculation section 333 first makes the user set the pixels representing the foreground area and the pixels representing the background area in the first image. The foreground area means an area corresponding to the body SC1 in the first image. The pixels representing the foreground area mean at least one of the pixels belonging to the foreground area. The foreground area is an example of a first area in the present disclosure. The pixels representing the foreground area in the first image are each an example of a second pixel in the present disclosure. The background area means an area corresponding to the background body SC2 in the first image. The pixels representing the background area mean at least one of the pixels belonging to the background area.

Figure 2:
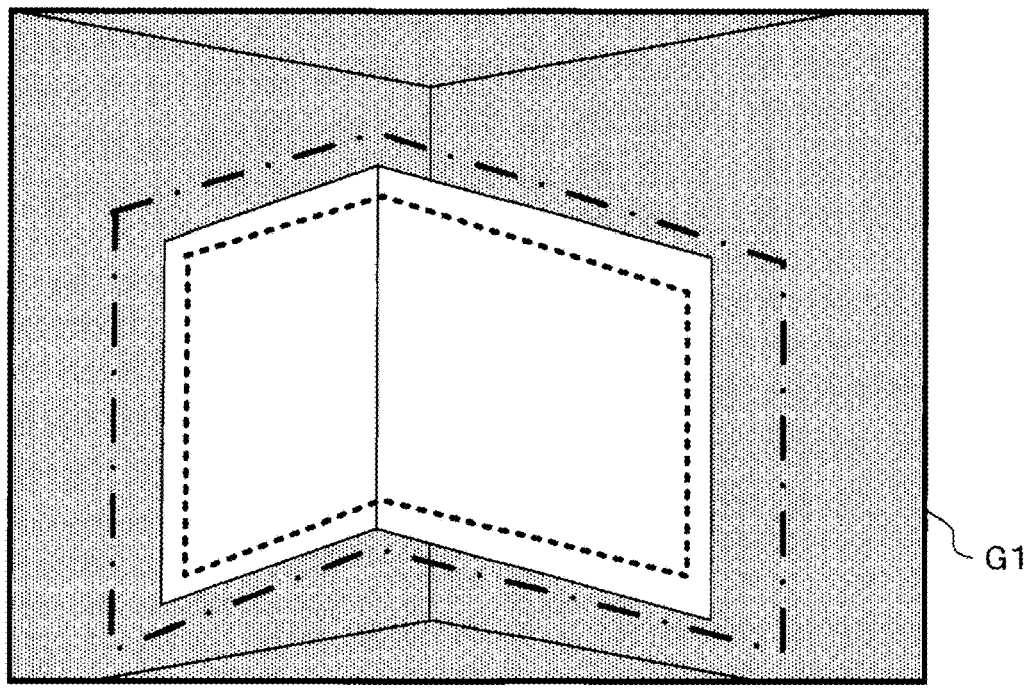
FIG. 2 is a diagram showing a setup example by the user of pixels representing a foreground area and pixels representing a background area.

In the present embodiment, the calculation section 333 makes the display device of the touch panel 310 display the first image. The user performs an operation of designating the pixels representing the foreground area and an operation of designating the pixels representing the background area on the touch panel 310 in the state of making the display device display the first image to thereby set the pixels representing the foreground area and the pixels representing the background area. As a specific example of the operation of designating the pixels representing the foreground area, there can be cited an operation of drawing a line or a dot in the foreground area. In the aspect of designating the pixels representing the foreground area using the operation of drawing a line or a dot, the pixels on the line or the dot drawn in the foreground area correspond to the pixels representing the foreground area. The same applies to the operation of designating the pixels representing the background area. FIG. 2 illustrates an aspect of designating the pixels representing the foreground area using the operation of drawing the line represented by the dotted line on the first image G1, and designating the pixels representing the background area using the operation of drawing the line represented by the dashed-dotted line.

Subsequently, the calculation section 333 performs a calculation using the reflected light information and the distance information as variables on each of the pixels constituting the first image to thereby calculate an index value as a result of the calculation pixel by pixel. In the present embodiment, the calculation section 333 calculates a first index value and a second index value for each of the pixels constituting the first image. The pixels to be subjected to the calculation of the index value are hereinafter referred to as target pixels.

The first index value is an index value calculated based on the luminance represented by the reflected light information of the pixel representing the foreground area and the distance represented by the distance information of the pixel representing the foreground area. The luminance represented by the reflected light information of the pixel representing the foreground area is hereinafter referred to as a first luminance reference. Further, the distance represented by the distance information of the pixel representing the foreground area is referred to as a first distance reference. When the number of the pixels representing the foreground area is one, it is sufficient to use the luminance represented by the reflected light information of that pixel as the first luminance reference. When the plurality of pixels representing the foreground area is set, it is sufficient to use an average value of the luminance values represented by the respective reflected light information of the plurality of pixels as the first luminance reference. The same applies to the first distance reference.

The second index value is an index value calculated based on the luminance represented by the reflected light information of the pixel representing the background area and the distance represented by the distance information of the pixel representing the background area. The luminance represented by the reflected light information of the pixel representing the background area is hereinafter referred to as a second luminance reference. Further, the distance represented by the distance information of the pixel representing the background area is referred to as a second distance reference. It is sufficient for the second luminance reference and the second distance reference to be calculated substantially the same manner as the first luminance reference and the first distance reference.

In the present embodiment, the calculation of calculating the first index value is addition of a result of multiplication of a difference between the luminance represented by the reflected light information of the target pixel and the first luminance reference and a first modulus $\alpha$, and a result of multiplication of a difference between the distance represented by the distance information of the target pixel and the first distance reference and a second modulus $\beta$. The first modulus $\alpha$ is zero or a positive value. The second modulus $\beta$ is also zero or a positive value. It should be noted that there is no chance that the first modulus $\alpha$ and the second modulus $\beta$ are both set to zero at the same time. In the present embodiment, the first modulus $\alpha$ and the second modulus $\beta$ are each a fixed value set in advance in the program 321. For example, it is assumed that the difference between the luminance represented by the reflected light information of the target pixel and the first luminance reference is represented by a square root of a value d11. Further, it is assumed that the difference between the distance represented by the distance information of the target pixel and the first distance reference is represented by a square root of a value d12. Regarding this target pixel, the calculation section 333 calculates the first index value J1 in accordance with the formula (1) described below. When the target pixel is a pixel representing the foreground area, since the value d11 and the value d12 each vanish or take a value approximate to zero, the first index value J1 vanishes or takes a value approximate to zero.

$$J1 = \alpha\sqrt{d11} + \beta\sqrt{d12} \qquad (1)$$

It should be noted that when the reflected light information is grayscale information representing gray levels of the respective colors of R, G, and B in the reflected light from the object SC, it is sufficient to calculate the first index value J1 using the value obtained by multiplying a square root of SSD (Sum of Squared Distance) of the gray levels of the respective colors represented by the reflected light information of the target pixel and the gray levels of the respective colors of the pixel representing the foreground area by the first modulus $\alpha$ as a first term in the right-hand side of the formula (1) described above.

In the present embodiment, the calculation of calculating the second index value is addition of a result of multiplication of a difference between the luminance represented by the luminance information of the target pixel and the second luminance reference and the first modulus $\alpha$, and a result of multiplication of a difference between the distance represented by the distance information of the target pixel and the second distance reference and the second modulus $\beta$. For example, it is assumed that the difference between the luminance represented by the reflected light information of the target pixel and the second luminance reference is represented by a square root of a value d21. Further, it is assumed that the difference between the distance represented by the distance information of the target pixel and the second distance reference is represented by a square root of a value d22. Regarding this target pixel, the calculation section 333 calculates the second index value J2 in accordance with the formula (2) described below. When the target pixel is a pixel representing the background area, since the value d21 and the value d22 each vanish or take a value approximate to zero, the second index value J2 vanishes or takes a value approximate to zero.

$$J2 = \alpha\sqrt{d21} + \beta\sqrt{d22} \qquad (2)$$

It should be noted that when the reflected light information is the grayscale information representing the gray levels of the respective colors of R, G, and B in the reflected light from the object SC, it is sufficient to calculate the second index value J2 using the value obtained by multiplying a square root of SSD (Sum of Squared Distance) of the gray levels of the respective colors represented by the reflected light information of the target pixel and the gray levels of the respective colors of the pixel representing the background area by the first modulus $\alpha$ as a first term in the right-hand side of the formula (2) described above.

The identification section 334 judges whether to belong to the foreground area with respect to each of the pixels constituting the taken image of the object SC based on the index value calculated by the calculation section 333 to thereby identify the foreground area. Specifically, the identification section 334 judges the pixel having the first index value J1 equal to zero or approximate to zero as the pixel belonging to the foreground area. Further, the identification section 334 judges the pixel having the second index value J2 equal to zero or approximate to zero as the pixel belonging to the background area. Further, it is possible for the identification section 334 to judge the pixel having the first index value J1 smaller than the second index value J2 as the pixel belonging to the foreground area, and to judge the pixel having the second index value J2 smaller than the first index value J1 as the pixel belonging to the background. As described above, by identifying the pixels belonging to the foreground area out of the pixels constituting the taken image of the object SC, there is realized segmentation of sectioning the first image into the foreground area and the background area.

The projection control section 335 sections the projection image to be projected from the projector 10 to the object SC into a second area corresponding to the foreground area identified by the identification section 334, and a third area other than the second area. Then, the projection control section 335 provides the image data representing the projection image in which the second area is filled with the first color and the third area is filled with the second color to the projector 10 to thereby make the projector 10 project the projection image in which the second area is filled with the first color and the third area is filled with the second color on the object SC. Further, it is possible for the projection control section 335 to make the projector 10 project the projection image in which a first content image is drawn in the second area, and a second content image different from the first content image is drawn in the third area on the object SC. The content image is an image representing, for example, a picture and a drawing. The projection image which the projection control section 335 makes the projector 10 project is not limited to the aspect described above, and is only required to be an aspect in which the second area and the third area are different from each other.

Figure 3:
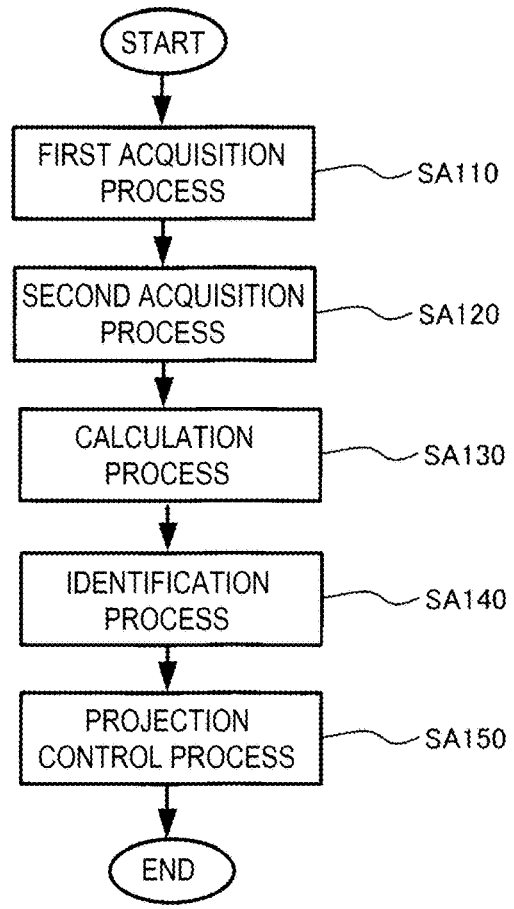
FIG. 3 is a flowchart showing a flow of the projection method to be executed by the processing device of the information processing device in accordance with a program.

Further, the processing device 330 which is operating in accordance with the program 321 executes a projection method according to the present disclosure. FIG. 3 is a flowchart showing a flow of the projection method according to the present disclosure. As shown in FIG. 3, the projection method according to the present disclosure includes a first acquisition process SA110, a second acquisition process SA120, a calculation process SA130, an identification process SA140, and a projection control process SA150.

In the first acquisition process SA110, the processing device 330 functions as the first acquisition section 331. In the first acquisition process SA110, the processing device 330 obtains the reflected light information related to the reflected light from the object SC for each of the pixels constituting the taken image based on the taken image of the object SC.

In the second acquisition process SA120, the processing device 330 functions as the second acquisition section 332. In the second acquisition process SA120, the processing device 330 obtains the distance information corresponding to the distance from each part of the object SC to the imaging device 20 for each of the pixels constituting the taken image of the object SC.

In the calculation process SA130, the processing device 330 functions as the calculation section 333. In the calculation process SA130, the processing device 330 makes the user set the pixels representing the foreground area and the pixels representing the background area, and then calculates the first index value and the second index value for each of the pixels constituting the taken image of the object SC.

In the identification process SA140, the processing device 330 functions as the identification section 334. In the identification process SA140, the processing device 330 judges whether to belong to the foreground for each of the pixels constituting the taken image of the object SC based on the first index value and the second index value calculated in the calculation process SA130 to thereby identify the foreground area in the taken image.

In the projection control process SA150, the processing device 330 functions as the projection control section 335. In the projection control process SA150, the processing device 330 sections the projection image to be projected from the projector 10 on the object SC into the second area corresponding to the foreground area and the third area other than the second area, and then makes the projector 10 project the projection image in which the second area is filled with the first color, and the third area is filled with the second color.

Figure 4:
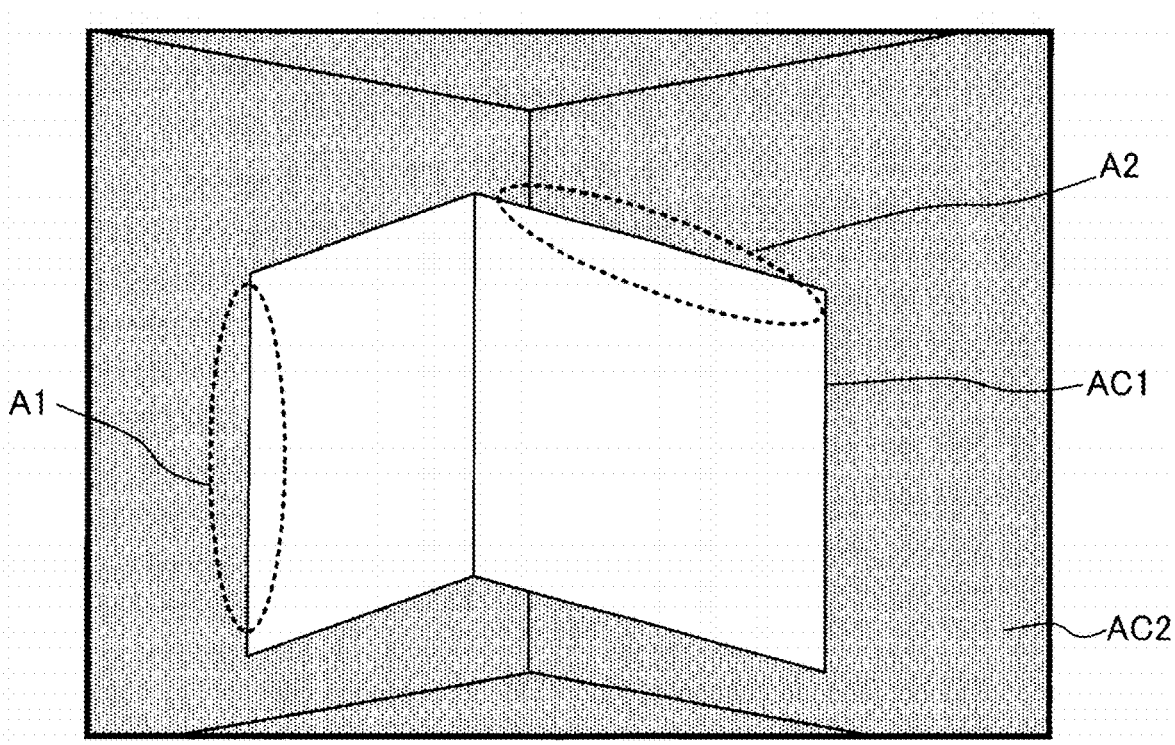
FIG. 4 is a diagram for explaining advantages of the present embodiment.

In the present embodiment, the foreground area is identified using the index value calculated based on the luminance of the reflected light from the object SC and the distance from the object SC to the imaging device 20. FIG. 4 is a diagram showing an example of the foreground area AC1 and the background area AC2 identified in the present embodiment when assuming the first modulus $\alpha$ as 1, and the second modulus $\beta$ as 0.1. The area A1 shown in FIG. 4 is an area in which a difference between the distance from the body SC1 to the imaging device 20 and the distance from the background body SC2 to the imaging device 20 is small. Further, the area A2 shown in FIG. 4 is an area in which a difference between the luminance of the reflected light from the body SC1 and the luminance of the reflected light from the background body SC2 is small.

Figure 5:
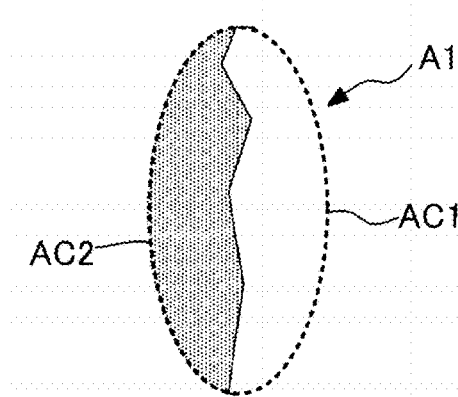
FIG. 5 is a diagram for explaining a problem when identifying the foreground area based only on reflected light information.

When adopting the aspect of identifying the foreground area based only on the distance information, an erroneous judgment can occur regarding the pixels belonging to the area A1. Therefore, in the aspect of identifying the foreground area based only on the distance information, irregularity occurs in the boundary line between the foreground area AC1 and the background area AC2 in the area A1 in some cases as shown in FIG. 5. In contrast, according to the present embodiment, since the judgment on whether or not the pixels belong to the foreground area is made based on the index value calculated from the reflected light information and the distance information, it is possible to avoid the occurrence of the erroneous judgment regarding the pixels belonging to the area A1.

Figure 6:
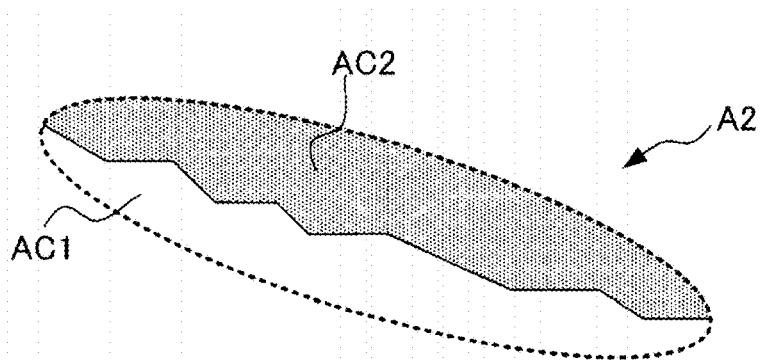
FIG. 6 is a diagram for explaining a problem when identifying the foreground area based only on distance information.

In contrast, when adopting the aspect of identifying the foreground area based only on the reflected light information, an erroneous judgment can occur regarding the pixels belonging to the area A2. Therefore, in the aspect of identifying the foreground area based only on the reflected light information, irregularity can occur in the boundary line between the foreground area AC1 and the background area AC2 in the area A2 as shown in FIG. 6. In contrast, according to the present embodiment, since the judgment on whether or not the pixels belong to the foreground area is made based on the index value calculated from the reflected light information and the distance information, it is possible to avoid the occurrence of the erroneous judgment regarding the pixels belonging to the area A2.

As described hereinabove, according to the present embodiment, even when there is no difference between the color of the body SC1 and the color of the background body SC2, or even when it is unachievable to accurately image the color in a specific wavelength band due to the characteristics of the camera, it becomes possible to accurately identify the foreground area.

2. Modified Examples

The embodiment described above can be modified as follows.

(1) The second acquisition section 332 in the embodiment described above obtains the second information corresponding to the distance from each part of the object SC to the imaging device 20 for each of the pixels constituting the taken image by the imaging device 20 based on the principle of the triangulation using the projection image to be projected from the projector 10 on the object SC and the taken image of the object SC by the imaging device 20. However, it is possible for the second information to be obtained for each of the pixels constituting the taken image by the imaging device 20 based on the principle of the triangulation using the taken image by the imaging device 20 of the object SC in the state in which the pattern image is projected from the projector 10 on the object SC, and the taken image of the object SC by the second camera disposed at a position different from the position of the imaging device 20. The taken image obtained by imaging the object SC in the state in which the pattern image is projected on the object SC with the second camera is an example of a third image in the present disclosure. The plurality of pixels constituting the third image is an example of fourth pixels corresponding one-to-one to the third pixels constituting the second image. Further, it is possible to adopt a configuration in which a distance camera is disposed separately from the imaging device 20, and the second information is obtained from a distance image obtained by imaging the object SC with the distance camera. The distance image obtained by imaging the object SC with the distance camera is an example of a fourth image in the present disclosure.

(2) In the embodiment described above, the pixels representing the foreground area and the pixels representing the background area are set by the user. However, it is possible to adopt a configuration in which either one of the pixels representing the foreground area and the pixels representing the background area are set by the user. When adopting an aspect in which only the pixels representing the foreground area are set by the user, the foreground area is identified using only the first index value. Specifically, the pixels having the first index value smaller than a predetermined threshold value are judged as the pixels belonging to the foreground area. When adopting an aspect in which only the pixels representing the background area are set by the user, the foreground area is identified using only the second index value. Specifically, the pixels having the second index value no smaller than a predetermined threshold value are judged as the pixels belonging to the foreground area. Further, it is also possible to adopt a configuration in which at least one of the pixels representing the foreground area and the pixels representing the background area in the taken image of the object SC are automatically set based on the distance information of each of the pixels. Since it is common that the distance from the body SC1 to the imaging device 20 and the distance from the background body SC2 to the imaging device 20 are different from each other, the outline of the foreground area can loosely be extracted based on the distance information of the respective pixels. Therefore, it is possible to set the pixels on a line obtained by shrinking the outline thus extracted based on the distance information as the pixels representing the foreground area. Similarly, it is possible to set the pixels on a line obtained by expanding the outline described above as the pixels representing the background area.

(3) In the embodiment described above, the first index value J1 is calculated in accordance with the formula (1), but it is possible to calculate the first index value J1 in accordance with the formula (3) or the formula (4) described below. The same applies to the second index value. In essence, it is sufficient for the calculation in the calculation section 333 to be the calculation of calculating the index value using the first information and the second information as variables.

$$J1 = d11^\alpha + d12^\beta \tag{3}$$

$$J1 = d11^\alpha \times d12^\beta \tag{3}$$

(4) The calculation section 333 in the embodiment described above calculates the index values using the first modulus and the second modulus both of which are the fixed values set in advance. However, it is possible for the calculation section 333 to make the touch panel 310 display a screen for prompting the user to set the first modulus and the second modulus in advance of the calculation of the index values to receive the operation of setting the first modulus and the second modulus from the user. Further, it is possible for the calculation section 333 to calculate the index values in accordance with the first modulus and the second modulus set by the user. According to the present embodiment, it becomes possible to make the user flexibly set which one of the judgment based on the color difference and the judgment based on the distance difference is prioritized in accordance with the circumstance.

Further, it is possible for the calculation section 333 to set the first modulus in accordance with a histogram of the appearance frequency of the luminance or the gray level in the first image represented by the reflected light information, and to set the second modulus in accordance with a histogram of the appearance frequency of the distance represented by the distance information in advance of the calculation of the index values. According to the present embodiment, when, for example, the first image is an image of each of frames constituting a moving image of the body SC1, it becomes possible to automatically set the first modulus and the second modulus suitable for each of the frames of the moving image.

Figure 7:
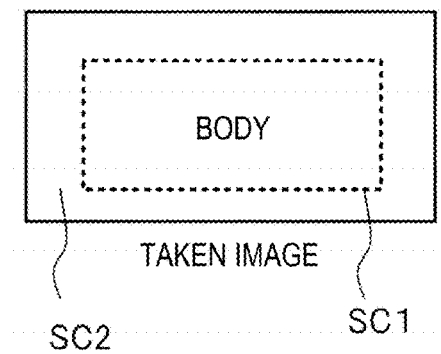
FIG. 7 is a diagram showing an example of a histogram representing the reflected light information.
Figure 7:
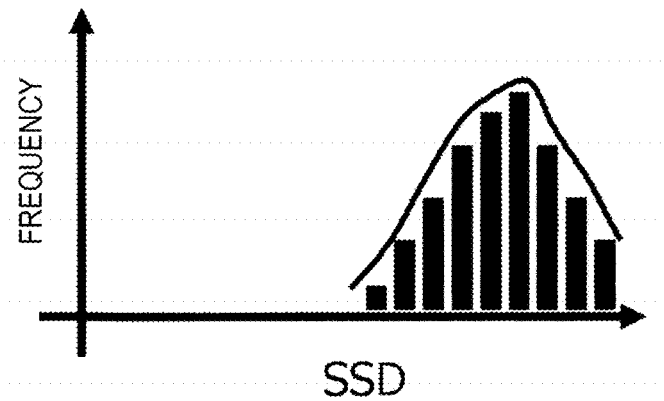
Figure 8:
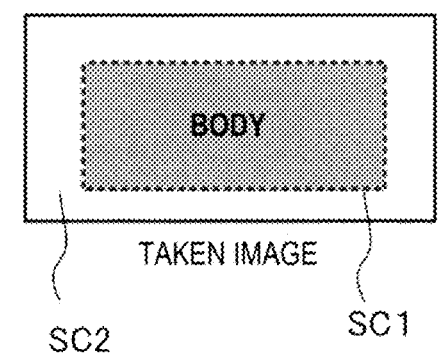
FIG. 8 is a diagram showing an example of the histogram representing the reflected light information.
Figure 8:
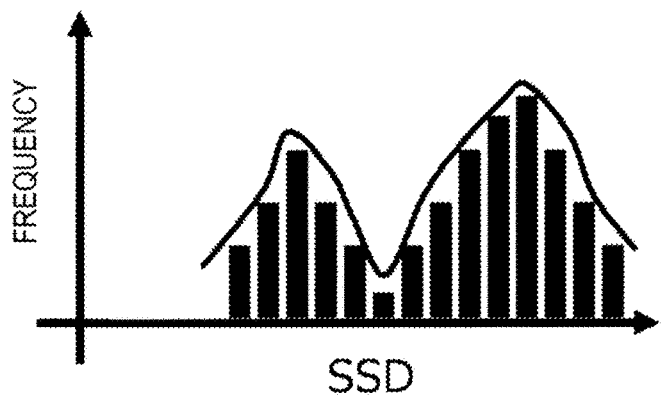
Figure 9:
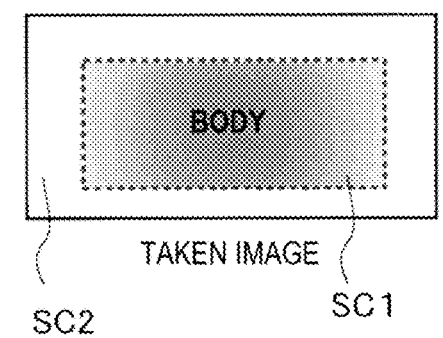
FIG. 9 is a diagram showing an example of the histogram representing the reflected light information.
Figure 9:
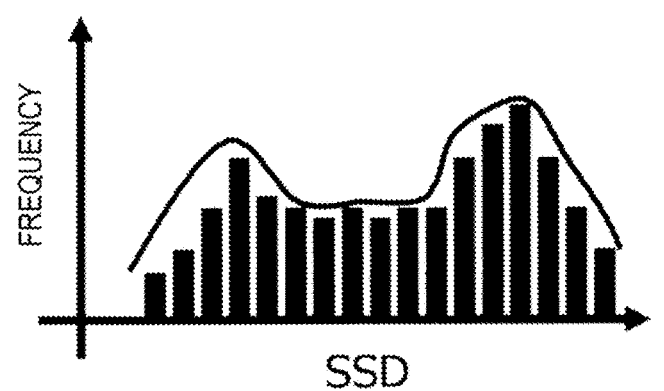

When the difference between the color of the body SC1 and the color of the background body SC2 is small, just one peak appears in the histogram of the appearance frequency of the SSD calculated based on the reflected light information as shown in FIG. 7. It should be noted that in FIG. 7, the outline of the body SC1 is drawn with a dotted line. In FIG. 8 and FIG. 9, the outline of the body SC1 is similarly drawn with a dotted line. In contrast, when the difference between the color of the body SC1 and the color of the background body SC2 is large, there appear two peaks in the histogram of the appearance frequency of the SSD as shown in FIG. 8. Further, when the boundary between the color of the body SC1 and the color of the background body SC2 is unclear such as when the boundary therebetween is shaded, the boundary between the two peaks is also smoothed as shown in FIG. 9. When the just one peak appears in the histogram of the appearance frequency of the SSD as shown in FIG. 7, by setting the first modulus to a value equal to zero or approximate to zero, there is avoided the occurrence of the erroneous judgment caused by the fact that the difference between the color of the body SC1 and the color of the background body SC2 is small.

Figure 10:
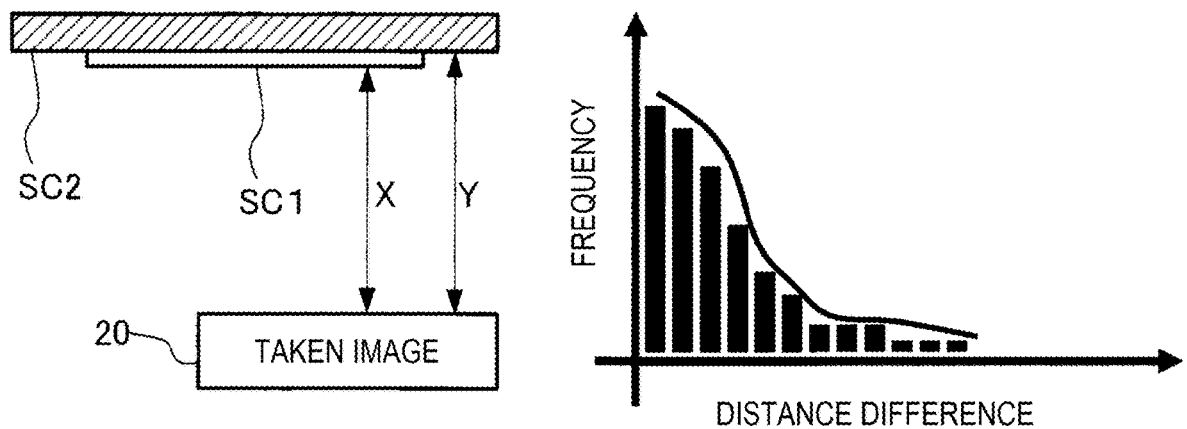
FIG. 10 is a diagram showing an example of a histogram representing the distance information.
Figure 11:
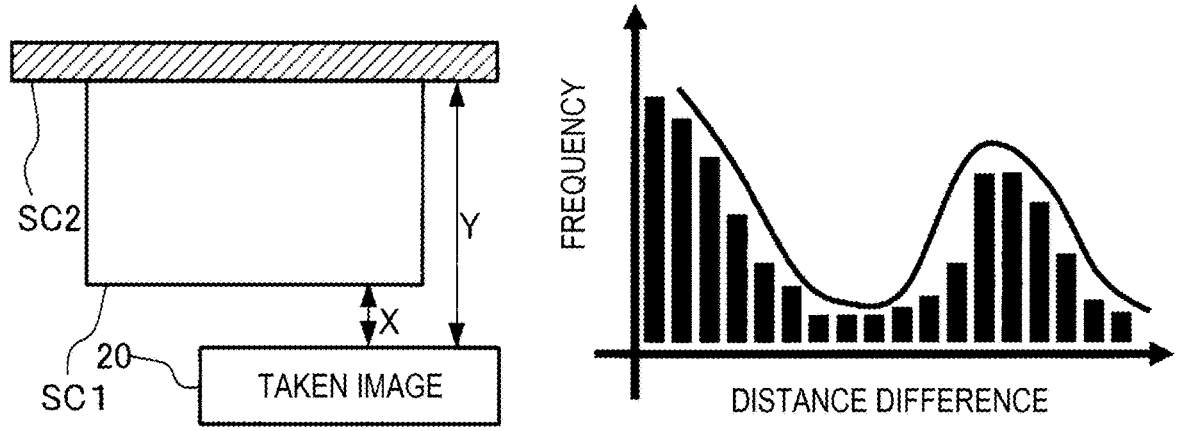
FIG. 11 is a diagram showing an example of the histogram representing the distance information.

As shown in FIG. 10, when the difference between the distance X from the body SC1 to the imaging device 20 and the distance Y from the background body SC2 to the imaging device is small, just one peak appears around (distance difference)=0 in the histogram of the appearance frequency of the distance difference calculated based on the distance information. In contrast, as shown in FIG. 11, when the difference between the distance X from the body SC1 to the imaging device 20 and the distance Y from the background body SC2 to the imaging device 20 is large, there appear two peaks in the histogram of the appearance frequency of the distance difference. When the just one peak appears in the histogram of the appearance frequency of the distance difference as shown in FIG. 10, by setting the second modulus to a value equal to zero or approximate to zero, there is avoided the occurrence of the erroneous judgment caused by the fact that the difference between the distance X from the body SC1 to the imaging device 20 and the distance Y from the background body SC2 to the imaging device 20 is small.

Further, it is possible for the calculation section 333 to set the first modulus and the second modulus based on a difference between the first luminance reference and the second luminance reference and a difference between the first distance reference and the second distance reference in advance of the calculation of the index values. More particularly, when the difference value between the first luminance reference and the second luminance reference is larger than the difference value between the first distance reference and the second distance reference, the calculation section 333 sets the first modulus and the second modulus so that the first modulus is larger in value than the second modulus. In contrast, when the difference value between the first luminance reference and the second luminance reference is smaller than the difference value between the first distance reference and the second distance reference, the calculation section 333 sets the first modulus and the second modulus so that the first modulus is smaller in value than the second modulus. Further, it is possible for the calculation section 333 to set the first modulus in accordance with the difference value between the first luminance reference and the second luminance reference, and to set the second modulus based on the difference between the first distance reference and the second distance reference. More particularly, the calculation section 333 sets the value of the first modulus so that the larger the difference value between the first luminance reference and the second luminance reference is, the larger the value of the first modulus becomes. Further, the calculation section 333 sets the value of the second modulus so that the larger the difference value between the first distance reference and the second distance reference is, the larger the value of the second modulus becomes. According to the present aspect, it becomes possible to automatically set a more preferable first modulus and a more preferable second modulus.

(5) The first acquisition section 331, the second acquisition section 332, the calculation section 333, the identification section 334, and the projection control section 335 in the embodiment described above are each a software module. However, some or all of the first acquisition section 331, the second acquisition section 332, the calculation section 333, the identification section 334, and the projection control section 335 can be realized by hardware. As an example of the hardware, there can be cited a DSP (Digital Signal Processor), an ASIC (Application Specific Integrated Circuit), a PLD (Programmable Logic Device), and an FPGA (Field Programmable Gate Array). Even when some or all of the first acquisition section 331, the second acquisition section 332, the calculation section 333, the identification section 334, and the projection control section 335 are realized by the hardware, the same advantages as in the embodiment described above are exerted.

(6) In the embodiment described above, the projection method including the first acquisition process SA110, the second acquisition process SA120, the calculation process SA130, the identification process SA140, and the projection control process SA150 is described. However, it is possible to provide a method obtained by eliminating the projection control process SA150 from the projection method, namely an identification method of identifying the foreground area corresponding to the body SC1 included in the object SC in the taken image of the object SC. Further, it is possible to provide an information processing device which is obtained by eliminating the projection control section 335 from the information processing device 30, and is therefore provided with the first acquisition section 331, the second acquisition section 332, the calculation section 333, and the identification section 334. By combining this information processing device and the imaging device 20 with each other, there is constituted an identification system for identifying the foreground area corresponding to the body SC1 included in the object SC in the taken image of the object SC by the imaging device 20. Further, the imaging device 20 is disposed separately from the information processing device 30 in the embodiment described above, but it is possible for the information processing device 30 to include the imaging device 20. As a specific example of the information processing device 30 including the imaging device 20, there can be cited a smartphone or a tablet terminal. Further, the information processing device 30 includes the display device in the embodiment described above, but it is possible to dispose the display device such as a liquid crystal display separately from the information processing device 30. Further, the projector 10 can be used as the display device.

(7) In the embodiment described above, the program 321 has already been stored in the storage device 320. However, the program 321 can be manufactured or distributed alone. As a specific method of distributing the program 321, there can be cited an aspect of writing the program 321 described above in a computer-readable recording medium such as a flash ROM (Read Only Memory) to distribute the recording medium, and an aspect of distributing the program 321 by downloading the program 321 via a telecommunication line such as the Internet.

3. Aspects Figured Out from at Least One of Embodiment and Modified Examples

The present disclosure is not limited to the embodiment and the modified examples described above, but can be implemented in a variety of aspects within the scope or the spirit of the present disclosure. For example, the present disclosure can also be implemented in the following aspects. The technical features in the embodiment described above corresponding to the technical features in each of the aspects described below can arbitrarily be replaced or combined in order to solve apart or the whole of the problem of the present disclosure, or to achieve some or all of the advantages of the present disclosure. Further, the technical feature can arbitrarily be eliminated unless described in the present specification as an essential element.

In order to solve the problems described above, the identification method according to the present disclosure includes the first acquisition process SA110, the second acquisition process SA120, the calculation process SA130, and the identification process SA140 described below. In the first acquisition process SA110, first information related to reflected light from a first object including a body is obtained for each of first pixels constituting a first image obtained by imaging the first object with a first camera based on the first image. In the second acquisition process SA120, second information corresponding to a distance from the first object to the first camera is obtained for each of the first pixels. In the calculation process SA130, a calculation using the first information and the second information as variables is executed to calculate an index value as a result of the calculation for each of the first pixels. In the identification process SA140, whether to belong to a first area of the first image corresponding to the body is judged for each of the first pixels based on the index value to thereby identify the first area. According to the identification method in the present aspect, even when the difference between the color of the body included in the object and the color of the background body other than the body is small, or even when it is unachievable to accurately image the color in a specific wavelength band due to the characteristics of the camera, it becomes possible to accurately identify the area corresponding to the body.

In the identification method according to a more preferable aspect, the first information may be at least one of luminance information representing luminance of the reflected light and grayscale information representing gray levels of colors of the reflected light. According to the identification method in the present aspect, by performing the judgment once based on the index value calculated from the luminance or the gray levels of the reflected light from the object and the distance from the object to the first camera for each of the pixels of the first image, it becomes possible to accurately identify the area corresponding to the body.

In the identification method according to another preferred aspect, in the calculation process SA130, a second pixel belonging to the first area may be set based on an instruction of a user or the second information in advance of execution of the calculation of calculating the index value. Further, the calculation executed in the calculation process SA130 may be addition of a result of multiplication of a difference between the first information with respect to the first pixel and the first information with respect to the second pixel and a first modulus, and a result of multiplication of a difference between the second information with respect to the first pixel and the second information with respect to the second pixel and a second modulus. According to the identification in the present aspect, it becomes possible to identify the area corresponding to the body based on the sum of the result of the multiplication of the difference between the first information with respect to the first pixel and the first information with respect to the second pixel and the first modulus, and the result of the multiplication of the difference between the second information with respect to the first pixel and the second information with respect to the second pixel and the second modulus.

In the identification method according to a more preferable aspect, the second information may be generated based on a pattern image to be projected from the projector 10 on the object SC, and a second image obtained by imaging the object SC in a state in which the pattern image is projected on the object SC with the imaging device 20. The second image may be constituted by a plurality of third pixels corresponding one-to-one to the first pixels constituting the first image. In the identification method according to another preferred aspect, the second information may be generated based on a second image obtained by imaging the object SC in a state in which the pattern image is projected from the projector 10 on the object SC with the imaging device 20, and a third image obtained by imaging the object SC with a second camera. The second image may be constituted by a plurality of third pixels corresponding one-to-one to the first pixels constituting the first image. The third image may be constituted by a plurality of fourth pixels corresponding one-to-one to the third pixels constituting the second image. Further, in the identification method according to a preferable aspect, the second information may be generated based on the fourth image obtained by imaging the first object with a distance camera configured to take a distance image in which a pixel value represents a distance to the object.

In the identification method according to another more preferable aspect, the first modulus and the second modulus may be set in advance. According to the present aspect, it becomes possible to calculate the index value for judging whether to belong to the area corresponding to the body for each of the pixels based on the first modulus and the second modulus set in advance.

In the identification method according to another more preferable aspect, setting of the first modulus and the second modulus may be received in advance of the calculation of the index value, and the index value may be calculated in accordance with the setting of the first modulus and the second modulus thus received. According to the identification method in the present aspect, it becomes possible to calculate the index value for judging whether to belong to the area corresponding to the body for each of the pixels based on the first modulus and the second modulus set by the user.

In the identification method according to another more preferable aspect, the first modulus may be set in accordance with a histogram of an appearance frequency of luminance or a gray level in the first image represented by the first information, and the second modulus may be set in accordance with a histogram of an appearance frequency of a distance represented by the second information in advance of the calculation of the index value. According to the identification method in the present aspect, it becomes possible to calculate the index value for judging whether to belong to the area corresponding to the body for each of the pixels based on the first modulus set in accordance with the histogram of the appearance frequency of the luminance or the gray level in the first image, and the second modulus set in accordance with the histogram of the appearance frequency of the distance represented by the second information.

Further, in view of the problems described above, the projection method according to the present disclosure includes the first acquisition process SA110, the second acquisition process SA120, the calculation process SA130, and the identification process SA140 described above, and further includes the projection control process SA150 described below. In the projection control process SA150, a projection image to be projected from the projector on the first object is sectioned into a second area corresponding to the first area and a third area other than the second area, and then the projector is made to project the projection image in which the second area is filled with a first color, and the third area is filled with a second color. According to the projection method in the present aspect, even when the difference between the color of the body included in the object and the color of the background body other than the body is small, or even when it is unachievable to accurately image the color in a specific wavelength band due to the characteristics of the camera, it becomes possible to accurately identify the area corresponding to the body. It becomes possible to project the projection image in which the area corresponding to the body is accurately filled with the first color, and the area corresponding to the background body other than the body is accurately filled with the second color on the first object.

Further, in view of the problems described above, an identification system according to the present disclosure includes a first camera, and an information processing device. The information processing device executes the first acquisition process SA110, the second acquisition process SA120, the calculation process SA130, and the identification process SA140 described above. According to the identification system in the present aspect, even when the difference between the color of the body included in the object and the color of the background body other than the body is small, or even when it is unachievable to accurately image the color in a specific wavelength band due to the characteristics of the camera, it becomes possible to accurately identify the area corresponding to the body.

Further, in view of the problems described above, The information processing device according to the present disclosure executes the first acquisition process SA110, the second acquisition process SA120, the calculation process SA130, and the identification process SA140 described above. According to the information processing device in the present aspect, even when the difference between the color of the body included in the object and the color of the background body other than the body is small, or even when it is unachievable to accurately image the color in a specific wavelength band due to the characteristics of the camera, it becomes possible to accurately identify the area corresponding to the body.

Further, in view of the problems described above, the non-transitory computer-readable storage medium storing a program according to the present disclosure stores the program which makes a computer execute the first acquisition process SA110, the second acquisition process SA120, the calculation process SA130, and the identification process SA140 described above. According to the non-transitory computer-readable storage medium storing the program in the present aspect, even when the difference between the color of the body included in the object and the color of the background body other than the body is small, or even when it is unachievable to accurately image the color in a specific wavelength band due to the characteristics of the camera, it becomes possible to accurately identify the area corresponding to the body.

What is claimed is:

1. An identification method comprising:
    obtaining first information for each of first pixels constituting a first image obtained by imaging a first object with a first camera, the first information related to reflected light from the first object including a body;
    obtaining second information for each of the first pixels, the second information corresponding to a distance from the first object to the first camera;
    obtaining an index value as a result of a calculation using the first information and the second information for each of the first pixels; and
    identifying whether each of the first pixels is a first area of the first image corresponding to the body or a second area of the first image corresponding to an area other than the first area by judging whether each of the first pixels belongs to the first area based on the index value.

2. The identification method according to claim 1, wherein
    the first information is at least one of luminance information representing luminance of the reflected light or grayscale information representing gray levels of colors of the reflected light.

3. The identification method according to claim 1, further comprising setting a second pixel belonging to the first area based on an instruction of a user or the second information in advance of execution of the calculation, wherein
    the index value represents addition of a result of multiplication of a first modulus and a difference between the first information with respect to the first pixel and the first information with respect to the second pixel, and a result of multiplication of a second modulus and a difference between the second information with respect to the first pixel and the second information with respect to the second pixel.

4. The identification method according to claim 1, wherein
    the second information is generated based on
        a pattern image to be projected from a projector on the first object, and
        a second image which is obtained by imaging the first object in a state in which the pattern image is projected on the first object with the first camera, and is constituted by a plurality of third pixels corresponding one-to-one to the first pixels constituting the first image.

5. The identification method according to claim 1, wherein
    the second information is generated based on
        a second image which is obtained by imaging the first object in a state in which a pattern image is projected on the first object from a projector with the first camera, and is constituted by a plurality of third pixels corresponding one-to-one to the first pixels constituting the first image, and
        a third image which is obtained by imaging the first object in a state in which the pattern image is projected on the first object with a second camera, and is constituted by a plurality of fourth pixels corresponding one-to-one to the third pixels constituting the second image.

6. The identification method according to claim 1, wherein
    the second information is generated based on a fourth image obtained by imaging the first object with a distance camera configured to take a distance image in which a pixel value represents a distance to an object.

7. The identification method according to claim 3, wherein
    the first modulus and the second modulus are set in advance.

8. The identification method according to claim 3, further comprising:
    receiving setting of the first modulus and the second modulus in advance of execution of the calculation; and
    calculating the index value in accordance with the setting of the first modulus and the second modulus received.

9. The identification method according to claim 3, further comprising:
   setting the first modulus in accordance with a histogram of an appearance frequency of luminance or a gray level in the first image represented by the first information; and
   setting the second modulus in accordance with a histogram of an appearance frequency of a distance represented by the second information in advance of execution of the calculation.

10. A projection method comprising:
   obtaining first information for each of first pixels constituting a first image obtained by imaging a first object with a first camera, the first information related to reflected light from the first object including a body;
   obtaining second information for each of the first pixels, the second information corresponding to a distance from the first object to the first camera;
   obtaining an index value as a result of a calculation using the first information and the second information for each of the first pixels;
   identifying a first area of the first image corresponding to the body by judging whether each of the first pixels belongs to the first area based on the index value; and
   projecting a projection image from a projector on the first object, the projection image being sectioned into a second area corresponding to the first area and a third area other than the second area, the second area is filled with a first color, and the third area is filled with a second color.

11. An identification system comprising:
   a first camera; and
   at least one processor that executes:
      obtaining first information for each of first pixels constituting a first image obtained by imaging a first object with the first camera, the first information related to reflected light from the first object including a body;
      obtaining second information for each of the first pixels, the second information corresponding to a distance from the first object to the first camera;
      obtaining an index value as a result of a calculation using the first information and the second information for each of the first pixels; and
      identifying whether each of the first pixels is a first area of the first image corresponding to the body or a second area of the first image corresponding to an area other than the first area by judging whether each of the first pixels belongs to the first area based on the index value.

* * * * *